United States Patent
Wette et al.

(10) Patent No.: US 6,426,033 B1
(45) Date of Patent: Jul. 30, 2002

(54) THERMOPLASTIC ELASTOMER ROLLED BELLOWS

(75) Inventors: Joachim Wette, Hennef; Karl-Heinz Müller, Wissen; Thomas Schafferus, Rheinberg, all of (DE)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/367,967
(22) PCT Filed: Feb. 21, 1998
(86) PCT No.: PCT/DE98/00552
§ 371 (c)(1),
(2), (4) Date: Nov. 19, 1999
(87) PCT Pub. No.: WO98/38435
PCT Pub. Date: Sep. 3, 1998

(30) Foreign Application Priority Data

Feb. 27, 1997 (DE) .......................................... 197 07 838

(51) Int. Cl.⁷ .............................................. B29C 35/08
(52) U.S. Cl. ..................... 264/459; 277/634; 264/478; 264/494; 264/496
(58) Field of Search ................................ 277/634, 635, 277/637, 650, 944; 264/459, 478, 494, 496

(56) References Cited

U.S. PATENT DOCUMENTS

| | | | |
|---|---|---|---|
| 4,681,800 A | * 7/1987 | Zerfass | ......................... 428/283 |
| 4,994,047 A | * 2/1991 | Walker et al. | ............... 604/264 |
| 5,175,032 A | * 12/1992 | Steele et al. | ................ 428/34.9 |
| 5,236,204 A | * 8/1993 | Hempel | ......................... 277/650 |

FOREIGN PATENT DOCUMENTS

| | | |
|---|---|---|
| DE | 1 000 076 | 10/1954 |
| DE | 37 11 032 A1 | 4/1987 |
| DE | 40 37 482 A1 | 11/1990 |
| DE | 42 06 950 A1 | 3/1992 |
| DE | 44 31 622 A1 | 9/1994 |
| DE | 195 44 911 A1 | 12/1995 |
| JP | 60 215164 | 10/1985 |
| JP | 5 125263 | 5/1993 |
| JP | 6 57062 | 3/1994 |

OTHER PUBLICATIONS

Günther Schreyer, Konstruieren mit Kunststofen, Teil 1.1, Auflage München, Carl Hanswer Verlag, 1972, S. 705–712.
Herausegegeben Von Dr. Bodo Carlowitz, Die Kunststoffe, Chemie, Physik, Technologie, Neuauflage München, Carl Hanswer Verlag, 1990, S. 545–546.

\* cited by examiner

Primary Examiner—Lynne H. Browne
Assistant Examiner—Enoch Peavey

(57) ABSTRACT

A rolling boot for sealing a universal joint, having a first collar with a larger diameter to be secured to the outer joint part of the universal joint and having a second collar with a smaller diameter to be secured to a shaft at the inner joint part of the universal joint, and having a semi-toroidal boot wall connecting the collars, wherein the rolling boot is an injection-moulded or blow-moulded product, the rolling boot consists of a thermo-plastic elastomer and the elastomer is irreversibly cross-linked up to a degree ranging between 15 and 85%.

4 Claims, 1 Drawing Sheet

THERMOPLASTIC ELASTOMER ROLLED BELLOWS

DESCRIPTION

Figure 1:
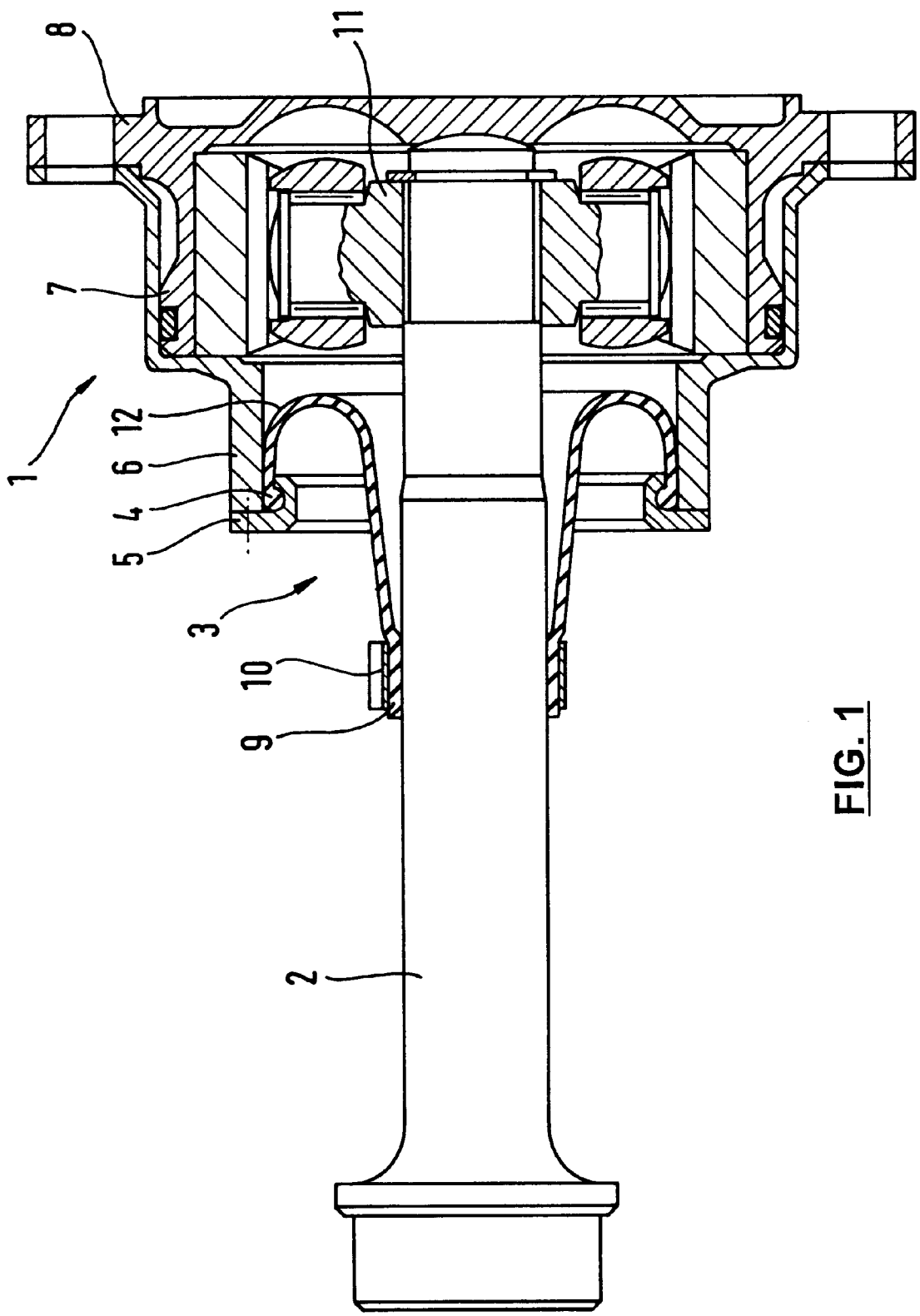

The invention relates to a rolling boot for sealing a universal joint, having a first collar with a larger diameter to be secured to the outer joint part of the universal joint and having a second collar with a smaller diameter to be secured to a shaft at the inner joint part of the universal joint, and having a semi-toroidal boot wall connecting the collars.

For high-speed joints in particular, rolling boots are preferable to convoluted boots, which are also known, because rolling boots are less sensitive to the effect of high centrifugal forces, and they remain dimensionally stable under the influence of the grease filling of the joint. A rolling boot of this type is known from DE 195 44 911 A1. A convoluted boot of thermoplastic elastomer is described in DE 40 37 482 A1.

In progressive joint designs which, at high speeds, also allow large articulation angles, previously used rolling boots made of rubber have been found to be inadequate. Because of the development of heat inside the joint satisfactory service life values are no longer obtainable for rolling boots. Rubber is not sufficiently resistant against the grease of the grease filling, but contact with the grease is unavoidable because of the high filling level.

It is therefore the object of the invention to provide a rolling boot which withstands extreme loads, i.e. very large articulation angles, even at high speeds during the entire service life of the joint at the usual load spectra.

The solution in accordance with the invention comprises a combination of the following characteristics:

the rolling boot is an injection-moulded or blow-moulded product, the rolling boot consists of a thermo-plastic elastomer, the elastomer is irreversibly cross-linked up to a degree ranging between 15 and 85%.

To achieve the required dimensional stability even at high speeds and large articulation angles, it is essential to use a thermo-plastic elastomer for injection moulding or blow moulding and subsequently, to irreversibly cross-link the thermo-plastic elastomer up to a degree ranging between 15 and 85%. By cross-linking the molecules, which is a chemical process, the elastomer loses its thermo-plastic property. As compared to uncross-linked thermoplastic elastomer, irreversible cross-linking provides effective protection against undesirable deformation at temporarily high operating temperatures of the rolling boot. The rolling boot in accordance with the invention can thus be subjected—without suffering any damage—to increased loads, i.e. high speeds at large articulation angles, even if the temperature of the material is increased, without any subsequent damage or failure. The material receives a higher endurance strength against fatigue. When changing from blow moulding to injection moulding, the rolling boot can be produced with a higher degree of precision, especially with an accurately observed wall thickness, so that the influence of out-of-balance is reduced substantially. This is particularly important in view of the high speeds aimed at.

Cross-linking in accordance with the invention can be achieved by chemical or thermal processes or, especially, by irradiating the injection-moulded part with β- or γ-rays. The process of cross-linking polymers or rubber under the influence of high-energy rays is known in itself, for example from G. Schreier, Konstruieren mit Kunststoffen (Designing with Plastics), Munich, 1972.

Preferred thermo-plastic elastomers which have the required strength properties and which can be cross-linked as required, are those based on esters.

As specially preferred cross-linking ranges, it is proposed to use values of 45 bis to 65° at which, on the one hand, the flexibility of the rolling boot is still sufficiently high and, on the other hand, the properties regarding the mechanical load bearing capacity and temperature resistance can be improved considerably.

Preferred embodiments of the inventive rolling boot and suitable methods of producing same are described in the sub-claims to which reference is hereby made.

Below, a rolling boot in accordance with the invention will be described with reference to the drawing wherein a longitudinal section shows a quadripode joint 1 with a plugged-in shaft 2 and a rolling boot 3. The rolling boot, in the usual way, comprises an outer collar 4 which is bead-shaped and which, by means of a holding ring 5, is clamped to an annular part 6. The annular part 6, in turn, is clamped to the outer joint part 7 of the quadripode joint 1. The outer joint part 7 comprises a flange 8 to be attached to a first attaching part.

A second collar 9 of the rolling boot is secured by a tensioning strip 10 to the shaft 1. Said shaft 1 is plugged into the inner joint part 11 of the joint 1. The first collar 4 and the second collar 9 are connected to one another by a substantially uniformly thick boot wall 12 which thus seals the joint at the shaft end. The shape of the rolling boot substantially corresponds to that of rolling boots according to the state of the art. The rolling boot embodiment shown is produced as an injection-moulded part.

What is claimed is:

1. A method of producing a rolling boot for sealing a universal joint wherein the boot comprises a first collar having a larger diameter to be secured to an outer joint part of the universal joint, a second collar with a smaller diameter to be secured to a shaft at an inner joint part of the universal joint, and a semi-toroidal boot wall connecting the first and second collars, the method comprising:

forming the rolling boot from uncross-linked thermoplastic elastomer by injection molding or blow molding, and subsequently irreversibly cross-linking the elastomer to a degree ranging between 15% and 85% wherein the step of cross-inking is achieved by β-radiation or γ-radiation.

2. The method of claim 1 wherein the elastomer is ester-based.

3. The method of claim 1 wherein the elastomer is cross-linked to a degree ranging between 45% and 65%.

4. The method of claim 3 wherein the elastomer is ester-based.

* * * * *